Patented Apr. 13, 1943

2,316,737

UNITED STATES PATENT OFFICE 2,316,737

PROCESS FOR PRODUCTION OF CARBON TETRACHLORIDE

Joy E. Beanblossom and Walton B. Scott, Niagara Falls, N. Y., assignors to Hooker Electrochemical Company, Niagara Falls, N. Y., a corporation of New York No Drawing. Application October 9, 1942,
Serial No. 461,450

6 Claims. (Cl. 260—664)

Our process relates more particularly to production of carbon tetrachloride by chlorination of carbon disulphide.

The fundamental reaction of carbon disulphide with chlorine is as follows:

$$CS_2 + 3Cl_2 \rightarrow CCl_4 S_2Cl_2 \quad (1)$$

This reaction readily goes to completion, but there is not always a sufficient demand for the $S_2Cl_2$ to render the process based upon the reaction commercially practicable. It is therefore necessary to find a way to return the sulphur monochloride to the process. It is also necessary to find a way to remove from the system at some stage a quantity of sulphur equivalent to that introduced as $CS_2$. Herein lies one of the chief difficulties in the way of production of carbon tetrachloride from carbon disulphide.

Sulphur monochloride may be considered a chlorinating agent and as such it may be reacted with more carbon disulphide. However, this reaction will not ordinarily go to completion. The incomplete reaction may, for purposes of illustration, be written as follows:

$$CS_2 + 2S_2Cl_2 \rightleftharpoons 0.2CS_2 + 0.4S_2Cl_2 0.8CCl_4 + 4.8S \quad (2)$$

If an attempt be made to distill off the product of reaction (2) the reaction tends to reverse and the product comes off mixed with $CS_2$, from which its separation is difficult. In the early days of the art this was not considered a serious objection, as the standard of purity for carbon tetrachloride was then much lower than at present. Today, however, carbon tetrachloride produced by reaction (2) would be unsaleable.

Instead of chlorinating the carbon disulphide by means of elemental chlorine or sulphur monochloride, as in reactions (1) and (2), it may be chlorinated by means of sulphur dichloride. The fundamental equation of this reaction is then as follows:

$$CS_2 + 6SCl_2 \rightarrow CCl_4 + 4S_4Cl_2 \quad (3)$$

This reaction readily goes to completion but here again sulphur monochloride is a by-product. If an effort be made to eliminate this, the reaction refuses to go to completion. A typical partial reaction of this nature is as follows:

$$CS_2 + 2SCl_2 \rightleftharpoons 0.1CS_2 + 0.2S_2Cl_2 + 0.9CCl_4 + 3.4S \quad (4)$$

As in the case of reaction (2), if an attempt be made to distill off the $CCl_4$ the reaction tends to reverse and the product comes off contaminated with $CS_2$.

The reaction between $CS_2$ and $S_2Cl_2$ can, if preferred, be carried out so as to leave no unreacted $S_2Cl_2$, by using an excess of $CS_2$, as follows:

$$3CS_2 + 4S_2Cl_2 \rightleftharpoons CS_2 + 2CCl_4 + 12S \quad (5)$$

However, the difficulty of separating the product from the $CS_2$ and sulphur still remains. As before, if an effort be made to distill off the product of this reaction, more or less reversal takes place and the product coming off is contaminated by $CS_2$.

In one of the most successful processes heretofore employed this difficulty has been met by alternating reactions (1) and (5), distilling off a part of the product after reaction (1), transferring the by-product to reaction (5), removing all the sulphur after this reaction and recycling the residuals to reaction (1). The removal of all the elemental sulphur liberated by the reaction at each cycle involves distilling off from it the $CS_2$ and $CCl_4$ of reaction (5). As has just been shown, this results in a certain amount of reversal of the reaction. Such reversal of course means a loss of capacity in the apparatus, necessitating a greater investment than otherwise.

We have now found a way in which to accomplish this same object, and one which avoids all of these fundamental difficulties. Instead of reaction (5), we make use of reaction (2) or reaction (4) and instead of removing all the sulphur after this reaction we remove preferably only enough to balance that introduced as $CS_2$. The remainder of the sulphur we chlorinate to $S_2Cl_2$. At the same time, we chlorinate any residual $CS_2$ to $CCl_4$ and $S_2Cl_2$, in accordance with reaction (1) or reaction (3). After this chlorination, we distill off substantially all the $CCl_4$, out of a mixture with $S_2Cl_2$, from which $CS_2$ is absent. We recycle the $S_2Cl_2$ to reaction (2).

Our process is susceptible of several variations, as follows:

I. In one of its embodiments, our process involves the following sequence of reactions and steps:

(a) React $CS_2$ with $S_2Cl_2$ as follows:

$$CS_2 + 2S_2Cl_2 \rightarrow 0.2CS_2 + 0.4S_2Cl_2 + 0.8CCl_4 + 4.8S \quad (2)$$

(b) Remove 2S, leaving 2.8S.

(c) Chlorinate the residue as follows:

$$0.2CS_2 + 0.4S_2Cl_2 + 0.8CCl_4 + 2.8S + 2Cl_2 \rightarrow CCl_4 + 2S_2Cl_2 \quad (6)$$

(d) Fractionate off the $CCl_4$ of reaction (6)

(e) Return the $2S_2Cl_2$ of reaction (6) to reaction (2) of the next cycle.

II. Instead of $S_2Cl_2$ we may use $SCl_2$ as the chlorinating agent in the first reaction of the process. The reaction of $CS_2$ with $SCl_2$ goes a little further toward completion than that of $CS_2$ with $S_2Cl_2$. The steps of the process are then as follows:

(a) React $CS_2$ with $SCl_2$ as follows:

$$CS_2 + 2SCl_2 \rightarrow 0.1CS_2 + 0.2S_2Cl_2 + 0.9CCl_4 + 3.4S \quad (4)$$

(b) Remove 2S, leaving 1.4S
(c) Chlorinate the residue as follows:

$$0.1CS_2 + 0.2S_2Cl_2 + 0.9CCl_4 + 1.4S + Cl_2 \rightarrow$$
$$CCl_4 + S_2Cl_2 \quad (7)$$

(d) Fractionate off the $CCl_4$ of reaction (7)
(e) Chlorinate the $S_2Cl_2$ of reaction (7), as follows:

$$S_2Cl_2 + Cl_2 \rightarrow 2SCl_2$$

(f) Return the $2SCl_2$ of reaction (8) to reaction (4) of the next cycle

III. Instead of using elemental chlorine as the chlorinating agent, in the reaction constituting the third step of the process, we may use $SCl_2$. The reactions and steps of the process are then as follows:

(a) React $CS_2$ with $S_2Cl_2$ as in I.

$$CS_2 + 2S_2Cl_2 \rightarrow 0.2CS_2 + 0.4S_2Cl_2 + 0.8CCl_4 + 4.8S \quad (2)$$

(b) Remove 2S, leaving 2.8S.
(c) Chlorinate the residue as follows:

$$0.2CS_2 + 0.4S_2Cl_2 + 0.8CCl_4 +$$
$$2.8S + 4SCl_2 \rightarrow CCl_4 + 4S_2Cl_2 \quad (9)$$

(d) Fractionate off the $CCl_4$ of reaction (9).
(e) Return $2S_2Cl_2$ of reaction (9) to reaction (2) of the next cycle.
(f) Chlorinate the remainder of the $4S_2Cl_2$ of reaction (9) as follows:

$$2S_2Cl_2 + 2Cl_2 \rightarrow 4SCl_2 \quad (10)$$

(g) Return the $4SCl_2$ of reaction (10) to reaction (9) of the next cycle.

IV. Instead of using $S_2Cl_2$ and $SCl_2$ as the chlorinating agents in the reactions constituting the first and third steps of the process respectively, we may use $SCl_2$ as the chlorinating agent in both of these steps. We then have the following sequence of operations:

(a) React $CS_2$ with $SCl_2$ as in II.

$$CS_2 + 2SCl_2 \rightarrow 0.1CS_2 + 0.2S_2Cl_2 + 0.9CCl_4 + 3.4S \quad (4)$$

(b) Remove 2S, leaving 1.4S.
(c) Chlorinate the residue as follows:

$$0.1CS_2 + 0.2S_2Cl_2 + 0.9CCl_4 +$$
$$1.4S + 2SCl_2 \rightarrow CCl_4 + 2S_2Cl_2 \quad (11)$$

(d) Fractionate off the $CCl_4$ of reaction (11).
(e) Chlorinate the $2S_2Cl_2$ of reaction (11) as follows:

$$2S_2Cl_2 + 2Cl_2 \rightarrow 4SCl_2 \quad (10)$$

(f) Return $2SCl_2$ of reaction (10) to reaction (4) and $2SCl_2$ to reaction (11) of the next cycle.

The crude product from each of these four variations of our process is of substantially the same analysis, showing typically 4 per cent of $SCl_2$ and $S_2Cl_2$. This product is then treated with lime, converting the $SCl_2$ and $S_2Cl_2$ to calcium sulphite and chloride, from which high grade product is separated by another fractionation The reactions of step (a) are preferably carried out at 65° to 70° C. In carrying out these reactions we add the $CS_2$ in a more or less continuous stream, preferably with agitation and refluxing, to equilibrium of the reaction, so that no considerable part of the product is permitted to escape from the mixture by vaporization. Obviously, if preferred vaporization can likewise be prevented by carrying on the reaction under pressure slightly greater than the vapor pressure of carbon tetrachloride at the temperature of reaction. Such a pressure will automatically develop if the reaction is carried out in a closed pressure tight vessel.

In carrying out step (b) we preferably cool the mixture and induce crystallization of the free sulphur. Since the 2S removed in step (b) is less than 60 per cent of the sulphur thrown out by the previous step it is a simple matter to induce this quantity of sulphur to crystallize out by merely cooling to room temperature. The mother liquor is then drained away from it and transferred to the next step. The crystalline sulphur is necessarily quite pure, but if desired it can be further purified by remelting and heating to drive off mother liquor. This sulphur can be regarded as a byproduct and used for purposes requiring sulphur of high purity. In a balanced system, however, it would naturally be returned to the process as $CS_2$.

In carrying out step (c) we add the chlorinating agent more or less continuously, with agitation and refluxing until the reaction is complete so that no escape of $CCl_4$ from the reaction mixture is permitted until the sulphur is completely chlorinated to $S_2Cl_2$.

The separation of the $CCl_4$ from the $S_2Cl_2$ in step (d) is a simple matter, as the former boils at 76.74° C. and the latter at 138° C. and there is no free sulphur present during this process to cause reversal.

No technical difficulties are therefore involved in our process and there is no separation of $CCl_4$ from $CS_2$ or distillation of $CCl_4$ out of a bath containing free sulphur.

In the foregoing illustration of the variations in our process the reactions are to be understood as typical and we do not wish to be limited to the proportions used therein. Obviously in step (a) the proportions are susceptible of considerable variation, so long as sufficient elemental sulphur is thrown out to render the removal of 2S per molecule of $CS_2$ practicable. When the chlorinating agent is $S_2Cl_2$ as in I (a) and III (a) the proportion of $S_2Cl_2$ to $CS_2$ must not be much less than 1 to 1, otherwise there will not be sufficient sulphur liberated to render the removal of 2S from the reaction mixture practicable. On the other hand, the proportions must not be much greater than 4 to 1, otherwise so much of the liberated sulphur will be in solution in the excess $S_2Cl_2$ that its removal will again become impractical. When the chlorinating agent is $SCl_2$ as in II (a) and IV (a) the ratio of $SCl_2$ to $CS_2$ must not be much less than 2 to 1, otherwise there will not be sufficient sulphur liberated to render the removal of 2S from the reaction mixture practicable. Moreover, the ratio of $SCl_2$ to $CS_2$ must not be much greater than 3 to 1, otherwise so much of the sulphur will be in the form of $S_2Cl_2$ or so much of the liberated sulphur in solution in the $S_2Cl_2$ resulting from the reaction that the same difficulty will be encountered. In step (c) it is desirable that the free sulphur be completely eliminated even though this may involve chlorinating a little beyond the end point and forming a little $SCl_2$. If $SCl_2$ should be formed during the chlorination, some of this will come off with the product. This will be removed by the lime purification and will represent only a slight loss of yield. This application is a continuation in part of application Serial No. 366,426, filed November 20, 1940.

We claim as our invention:

1. The process for production of carbon tetrachloride which comprises successively (a) reacting one mol of carbon disulphide with substantially one to four mols of sulphur monochloride until an equilibrium mixture is obtained, said mixture containing substantially all the carbon tetrachloride and elemental sulphur produced by the reaction, together with the reagents remaining unreacted; (b) crystallizing out and removing from the mixture resulting from step (a), including the carbon tetrachloride, elemental sulphur and residual reagents, elemental sulphur substantially equal to the sulphur content of the carbon disulphide; (c) subjecting the mixture resulting from step (b), including the carbon tetrachloride and remainder of the elemental sulphur produced in step (a), together with the residual reagents, to the action of a chlorinating agent of the group consisting of elemental chlorine and sulphur dichloride, to chlorinate the carbon of the residual carbon disulphide substantially completely to carbon tetrachloride and the residual sulphur as well as the sulphur of the carbon disulphide substantially completely to sulphur monochloride, and (d) distilling the carbon tetrachloride away from the sulphur monochloride in the mixture resulting from step (c) as far as practicable, leaving the sulphur monochloride available for use in a succeeding cycle of the process.

2. The process for production of carbon tetrachloride which comprises successively (a) reacting one mol of carbon disulphide with substantially one to four mols of sulphur monochloride until an equilibrium mixture is obtained, said mixture containing substantially all the carbon tetrachloride and elemental sulphur produced by the reaction, together with the reagents remaining unreacted; (b) crystallizing out and removing from the mixture resulting from step (a), including the carbon tetrachloride, elemental sulphur and residual reagents, elemental sulphur substantially equal to the sulphur content of the carbon disulphide; (c) subjecting the mixture resulting from step (b), including the carbon tetrachloride and remainder of the elemental sulphur produced in step (a), together with the residual reagents, to the action of elemental chlorine, to chlorinate the carbon of the residual carbon disulphide substantially completely to carbon tetrachloride and the residual sulphur as well as the sulphur of the carbon disulphide substantially completely to sulphur monochloride, and (d) distilling the carbon tetrachloride away from the sulphur monochloride in the mixture resulting from step (c) as far as practicable, leaving the sulphur monochloride available for use in a succeeding cycle of the process.

3. The process for production of carbon tetrachloride which comprises successively (a) reacting one mol of carbon disulphide with substantially one to four mols of sulphur monochloride until an equilibrium mixture is obtained, said mixture containing substantially all the carbon tetrachloride and elemental sulphur produced by the reaction, together with the reagents remaining unreacted; (b) crystallizing out and removing from the mixture resulting from step (a), including the carbon tetrachloride, elemental sulphur and residual reagents, elemental sulphur substantially equal to the sulphur content of the carbon disulphide; (c) subjecting the mixture resulting from step (b), including the carbon tetrachloride and remainder of the elemental sulphur produced in step (a), together with the residual reagents, to the action of sulphur dichloride, to chlorinate the carbon of the residual carbon disulphide substantially completely to carbon tetrachloride and the residual sulphur as well as the sulphur of the carbon disulphide substantially completely to sulphur monochloride, and (d) distilling the carbon tetrachloride away from the sulphur monochloride in the mixture resulting from step (c) as far as practicable, leaving the sulphur monochloride available for use in a succeeding cycle of the process.

4. The process for production of carbon tetrachloride which comprises successively (a) reacting one mol of carbon disulphide with substantially two mols of sulphur monochloride until an equilibrium mixture is obtained, said mixture containing substantially all the carbon tetrachloride and elemental sulphur produced by the reaction, together with the reagents remaining unreacted; (b) crystallizing out and removing from the mixture resulting from step (a), including the carbon tetrachloride, elemental sulphur and residual reagents, elemental sulphur substantially equal to the sulphur content of the carbon disulphide; (c) subjecting the mixture resulting from step (b), including the carbon tetrachloride and remainder of the elemental sulphur produced in step (a), together with the residual reagents, to the action of a chlorinating agent of the group consisting of elemental chlorine and sulphur dichloride, to chlorinate the carbon of the residual carbon disulphide substantially completely to carbon tetrachloride and the residual sulphur as well as the sulphur of the carbon disulphide substantially completely to sulphur monochloride, and (d) distilling the carbon tetrachloride away from the sulphur monochloride in the mixture resulting from step (c) as far as practicable, leaving the sulphur monochloride available for use in a succeeding cycle of the process.

5. The process for production of carbon tetrachloride which comprises successively (a) reacting one mol of carbon disulphide with substantially one to four mols of sulphur monochloride with refluxing until an equilibrium mixture is obtained, said mixture containing substantially all the carbon tetrachloride and elemental sulphur produced by the reaction, together with the reagents remaining unreacted; (b) crystallizing out and removing from the mixture resulting from step (a), including the carbon tetrachloride, elemental sulphur and residual reagents, elemental sulphur substantially equal to the sulphur content of the carbon disulphide; (c) subjecting the mixture resulting from step (b), including the carbon tetrachloride and remainder of the elemental sulphur produced in step (a), together with the residual reagents, to the action of a chlorinating agent of the group consisting of elemental chlorine and sulphur dichloride, to chlorinate the carbon of the residual carbon disulphide substantially completely to carbon tetrachloride and the residual sulphur as well as the sulphur of the carbon disulphide substantially completely to sulphur monochloride, and (d) distilling the carbon tetrachloride away from the sulphur monochloride in the mixture resulting from step (c) as far as practicable, leaving the sulphur monochloride available for use in a succeeding cycle of the process.

6. The process for production of carbon tetrachloride which comprises successively (a) adding carbon disulphide to sulphur monochloride, with refluxing, until one mol of carbon disulphide has been added to one to four mols of sulphur monochloride and an equilibrium mixture is obtained, at 65° to 70° C., said mixture containing substantially all the carbon tetrachloride and elemental sulphur produced by the reaction, together with the reagents remaining unreacted; (b) crystallizing out and removing from the mixture resulting from step (a), including the carbon tetrachloride, elemental sulphur and residual reagents, elemental sulphur substantially equal to the sulphur content of the carbon disulphide; (c) subjecting the mixture resulting from step (b), including the carbon tetrachloride and remainder of the elemental sulphur produced in step (a), together with the residual reagents, to the action of a chlorinating agent of the group consisting of elemental chlorine and sulphur dichloride, to chlorinate the carbon of the residual carbon disulphide substantially completely to carbon tetrachloride and the residual sulphur as well as the sulphur of the carbon disulphide substantially completely to sulphur monochloride, and (d) distilling the carbon tetrachloride away from the sulphur monochloride in the mixture resulting from step (c) as far as practicable, leaving the sulphur monochloride available for use in a succeeding cycle of the process.

JOY E. BEANBLOSSOM.
WALTON B. SCOTT.